(12) United States Patent
Honermann et al.

(10) Patent No.: US 10,750,654 B2
(45) Date of Patent: Aug. 25, 2020

(54) CAPTURED HARDWARE EQUIPMENT MOUNTING SYSTEM FOR AN AGRICULTURAL PRODUCT APPLICATOR

(71) Applicant: CNH Industrial America LLC, New Holland, PA (US)

(72) Inventors: John P. Honermann, Benson, MN (US); Scott Reese, New London, MN (US); Rex L. Ruppert, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 171 days.

(21) Appl. No.: 15/704,519

(22) Filed: Sep. 14, 2017

(65) Prior Publication Data
US 2019/0075708 A1 Mar. 14, 2019

(51) Int. Cl.
| | |
|---|---|
| *F16B 7/14* | (2006.01) |
| *A01B 76/00* | (2006.01) |
| *B62D 65/02* | (2006.01) |
| *A01M 7/00* | (2006.01) |
| *B62D 49/06* | (2006.01) |
| *A01B 59/00* | (2006.01) |
| *A01B 59/06* | (2006.01) |
| *F16B 7/18* | (2006.01) |
| *A01C 23/04* | (2006.01) |

(52) U.S. Cl.
CPC .............. *A01B 76/00* (2013.01); *A01B 59/00* (2013.01); *A01B 59/062* (2013.01); *A01M 7/0082* (2013.01); *B62D 49/065* (2013.01); *B62D 65/02* (2013.01); *F16B 7/187* (2013.01); *A01C 23/047* (2013.01)

(58) Field of Classification Search
CPC ..... F16B 7/187; F16B 37/045; A01M 7/0082; A01B 76/00; A01B 59/00; A01B 59/062; A01C 23/047; B62D 49/065; B62D 65/02
See application file for complete search history.

(56) References Cited

U.S. PATENT DOCUMENTS

| | | | | |
|---|---|---|---|---|
| 2,275,302 | A * | 3/1942 | Magnuson | A01M 7/0082 280/839 |
| 2,332,752 | A * | 10/1943 | Ratcliff | A01B 59/00 403/388 |
| 3,680,620 | A * | 8/1972 | Gotschel | E06B 1/18 411/176 |

(Continued)

FOREIGN PATENT DOCUMENTS

| | | | |
|---|---|---|---|
| CN | 201636180 | 11/2010 | |
| CN | 204878247 | 12/2015 | |
| DE | 102005026619 A1 * | 10/2006 | ............. F16B 7/187 |

*Primary Examiner* — Matthew R McMahon
(74) *Attorney, Agent, or Firm* — Rebecca L. Henkel; Rickard K. DeMille

(57) ABSTRACT

A captured hardware system secures a mounting plate of skid-mounted product application equipment to a frame of the applicator, utilizing a mounting bolt passing through a hole in the skid mounting plate, a mounting bar and an extended T-nut. The T-nut has a bar-shaped body that extends beyond an exposed edge of the mounting bar to facilitate aligning a threaded hole in the T-nut with a hole in the mounting bar, when the T-nut is slidingly inserted into a slot in the mounting bar for securing the skid to the frame with the mounting bolt.

10 Claims, 3 Drawing Sheets

(56) References Cited

U.S. PATENT DOCUMENTS

| | | | |
|---|---|---|---|
| 4,957,402 A * | 9/1990 | Klein | F16B 37/045 411/166 |
| 5,363,625 A * | 11/1994 | Philippi | E04B 1/5831 52/653.2 |
| 5,380,136 A | 1/1995 | Copple et al. | |
| 5,411,356 A | 5/1995 | Travis et al. | |
| 5,628,598 A | 5/1997 | Hoefle | |
| 6,244,806 B1 | 6/2001 | Kato | |
| 7,086,817 B2 | 8/2006 | Clinch et al. | |
| 8,100,600 B2 * | 1/2012 | Blum | F16B 37/045 403/256 |
| 8,413,739 B2 | 4/2013 | Casper et al. | |
| 8,910,725 B2 | 12/2014 | Kromminga | |
| 9,016,972 B2 * | 4/2015 | Oetlinger | F16B 12/50 403/252 |
| 9,212,675 B2 * | 12/2015 | Oetlinger | F16B 7/187 |
| 9,764,780 B2 * | 9/2017 | Zehner | F16B 7/187 |
| 2010/0303538 A1 | 12/2010 | Kor et al. | |
| 2013/0320175 A1 * | 12/2013 | Kemple | F16B 7/0493 248/316.1 |
| 2014/0190712 A1 | 7/2014 | Bassett | |
| 2018/0298931 A1 * | 10/2018 | Oetlinger | F16B 5/0642 |
| 2019/0003500 A1 * | 1/2019 | Oetlinger | F16B 5/02 |
| 2019/0075709 A1 * | 3/2019 | Reese | A01B 76/00 |

\* cited by examiner

CAPTURED HARDWARE EQUIPMENT MOUNTING SYSTEM FOR AN AGRICULTURAL PRODUCT APPLICATOR

FIELD OF THE INVENTION

This invention generally relates to mounting equipment on the chassis of an agricultural product applicator, and more particularly to hardware systems for use in mounting removable agricultural product application equipment to a frame of a chassis of an agricultural product applicator.

BACKGROUND OF THE INVENTION

Modern agricultural practices rely heavily on timely application of agricultural products such as fertilizers and chemicals. Some of these products are applied in dry form using dry product spreading equipment, and others are applied in liquid form using sprayers.

It is advantageous to mount the dry and liquid product application equipment on separate skids, that can be interchangeably mounted on the same product applicator. Such skid-mounted equipment is typically large in size and heavy, weighing as much as several thousand pounds. Lifting the skid-mounted equipment into place typically requires the use of some sort of crane or lifting arrangement.

The equipment-carrying skid must be precisely aligned on the frame of the applicator to properly interface with hydraulic and electrical connections, and mounting hardware that secures the skid to the frame. Also, the skid-mounted equipment must be properly positioned and secured on the applicator to properly balance the large loads of the application equipment and product on the frame of the applicator, so that the applicator can safely operate while travelling over uneven terrain, ruts, ditches and the like, during application of the agricultural product.

In the past, skid-mounted equipment had to be manually guided onto the frame of the applicator in such a manner that mounting holes and features were properly aligned, often while the skid was dangling from an overhead crane or lifting device. It is desirable to provide an improved apparatus and method for aligning skid-mounted application equipment onto the frame of an applicator, in a manner that is more precise and less cumbersome than in prior approaches.

The combination of heavy payloads and jarring forces imposed on the applicator during operation require that elements of a fastening system used to secure the skid to the frame must operate in a challenging environment withstanding continuously shifting shear and tensile loads. In the past, fastening systems for use in securing agricultural product application equipment to the chassis of an applicator typically resorted to bulky fasteners to provide the necessary combination of resistance to dynamic shear and tensile loading conditions, it is also highly desirable, therefore that an improved hardware system for securing equipment to an agricultural product applicator provide the necessary load-resisting properties and functionality in a form that is more compact, efficient and effective than prior hardware systems used for such applications. In particular, it is desirable that an improved hardware system be adaptable to mounting arrangements where access to the back side of mounting features, for threading nuts onto mounting bolts, for example, is difficult, or completely blocked.

BRIEF SUMMARY OF THE INVENTION

The invention provides an improved hardware system, apparatus and method for attaching skid-mounted agricultural product application equipment to the frame of an agricultural product applicator.

According to one aspect of the invention, a captured hardware system is provided for securing a mounting plate of skid-mounted product application equipment to a frame of the applicator, utilizing a mounting bolt passing through a hole in the skid mounting plate, a mounting bar and an extended T-nut. The T-nut has a bar-shaped body that extends beyond an exposed edge of the mounting bar to facilitate aligning a threaded hole in the T-nut with a hole in the mounting bar, when the T-nut is slidingly inserted into a slot in the mounting bar for securing the skid to the frame with the mounting bolt.

According to another aspect of the invention, a shear block mounting system is provided for securing a mounting plate of skid-mounted product application equipment to a frame of the applicator, utilizing a mounting bolt passing through a hole in the skid mounting plate, a mounting bar and a shear block. The shear block has a pilot that operatively engages a recess in the mounting bar in such a manner that shear forces are substantially transferred between the skid and frame substantially through the shear block pilot when the skid is joined to the frame by the mounting bolt passing through skid mounting plate and the shear block and the into operative engagement with the mounting bar.

One form of a captured hardware system for securing a skid mounting plate of skid-mounted product application equipment to a frame of the applicator, using a mounting bolt passing through a hole in the skid mounting plate, includes a mounting bar and an extended T-nut.

The mounting bar may define a mating surface and an exposed edge of the mounting bar. The mounting bar may also define a slot disposed below and opposite the mating surface and extending transversely from the exposed edge of the mounting bar in a direction generally parallel to the mating surface. The mounting bar may further define a bolt hole disposed at a distance from the exposed edge and extending through the mating surface into the transverse slot.

The extended T-nut may have a bar-shaped body configured for sliding insertion into the slot in the mounting bar and a threaded hole for receipt of a mounting bolt oriented for alignment with the bolt hole in the mounting bar when the extended T-nut is inserted into the slot in the mounting bar for securing the skid to the frame with the mounting bolt passing through the hole in the skid mounting plate. The threaded hole in the body of the T-nut may be disposed such that the body of the T-nut includes an exposed end that extends beyond the exposed edge of the mounting bar when the threaded hole in the T-nut is aligned with the bolt hole in the mounting bar. Having the body of the T-nut extend beyond the mounting bar, in this manner, facilitates positioning the T-nut within the slot for aligning the threaded hole in the T-nut with the hole in the mounting bar. This is particularly advantageous in applications where access to the threaded end of the mounting bolt would otherwise be difficult or impossible, for threading a conventional nut onto the bolt and holding it in place while tightening the mounting bolt.

In some forms of the invention, the exposed end of the T-nut may include a hole, or other positioning feature, to facilitate sliding the T-nut in the slot of the mounting bar for aligning the threaded hole in the T-nut with the hole in the mounting bar.

In some forms of the invention, the mounting bar may be integral with the frame. The transverse slot may be at least partly closed opposite the mating surface, impeding access to a distal end of the mounting bolt when the mounting bolt is inserted through the hole in the mounting bar, if such an arrangement is required or desirable in practicing the invention.

A captured hardware system, according to the invention may include multiple slot-mounted T-nuts. For example, the mounting bar may include at least one exposed edge and first and second slots extending substantially parallel to one another, with each of the at least two slots disposed below and opposite the mating surface and extending transversely from the exposed edge of the mounting bar in a direction generally parallel to the mounting surface and one another. The mounting bar may further define first and second bolt holes disposed at the same distance from the exposed edge and extending respectively through the mating surface into the first and second slots. A captured hardware system for such an arrangement, may further include a second T-nut, according to the invention, for sliding insertion into the second slot.

Some forms of a captured hardware system, according to the invention, may further include a shear block adapted for insertion through the skid mounting plate and into engagement with the mounting bar for resisting shear forces on a mounting bolt securing the skid to the frame. The shear block may have a body defining a bolt hole therein for passage therethrough of a mounting bolt and a pilot configured for engagement with the mounting bar and the hole in the skid mounting plate. The mounting bar may further include a recess in the mating surface adapted for receiving the pilot of the shear block. The pilot and bolt hole in the shear block, the hole through the skid mounting plate, and the recess in the mounting surface may be cooperatively configured in such a manner that shear forces are transferred between the skid and frame substantially through the shear block pilot.

The shear block may also have a longitudinal length configured to provide a desired tensile stress at a predetermined torque on a mounting bolt passing through the block and into threaded engagement with the bolt hole in the T-nut.

The invention may also take the form of an agricultural product applicator including a captured hardware system, or a combined shear block and captive hardware system according to the invention, for securing skid mounted, agricultural product, application equipment to a frame of the applicator.

The invention may also take the form of a method for securing a mounting plate of an equipment-carrying skid to a mounting surface of a frame of an agricultural product applicator using a mounting bolt passing through a hole in the skid mounting plate and a hardware system including a mounting bar, and an extended T-nut for securing the skid to the of the applicator. Such a method may include one or more steps such as: utilizing the exposed end of the T-nut for aligning the threaded hole in the T-nut with the hole in the mounting bar; utilizing a positioning feature of the exposed end of the T-nut for positioning the T-nut in the slot; providing and positioning first and second extended T-nuts in first and second slots respectively of a mounting bar, according to the invention, and utilizing the exposed ends of the first and second T-nuts, for aligning the threaded holes in the first and second T-nuts with the first and second bolt holes in the mounting bar; inserting the pilot of a shear block, according to the invention through the hole in the skid mounting plate and into operative engagement with the recess in the mounting surface; and, inserting the mounting bolt through the shear block into threaded engagement with the threaded hole in the T-nut and tightening the mounting bolt to the predetermined torque.

Other aspects, objects and advantages of the invention will be apparent from the following detailed description and accompanying drawings of exemplary embodiments.

BRIEF DESCRIPTION OF THE DRAWINGS

The accompanying drawings incorporated in and forming a part of the specification illustrate several aspects of the present invention and, together with the description, serve to explain the invention. In the drawings.

While the invention will be described in connection with specific exemplary embodiments, there is no intent to limit practice of the invention to those embodiments. On the contrary, the intent is to cover all alternatives, modifications and equivalents as included within the spirit and scope of the invention.

DETAILED DESCRIPTION OF THE INVENTION

Figure 1:
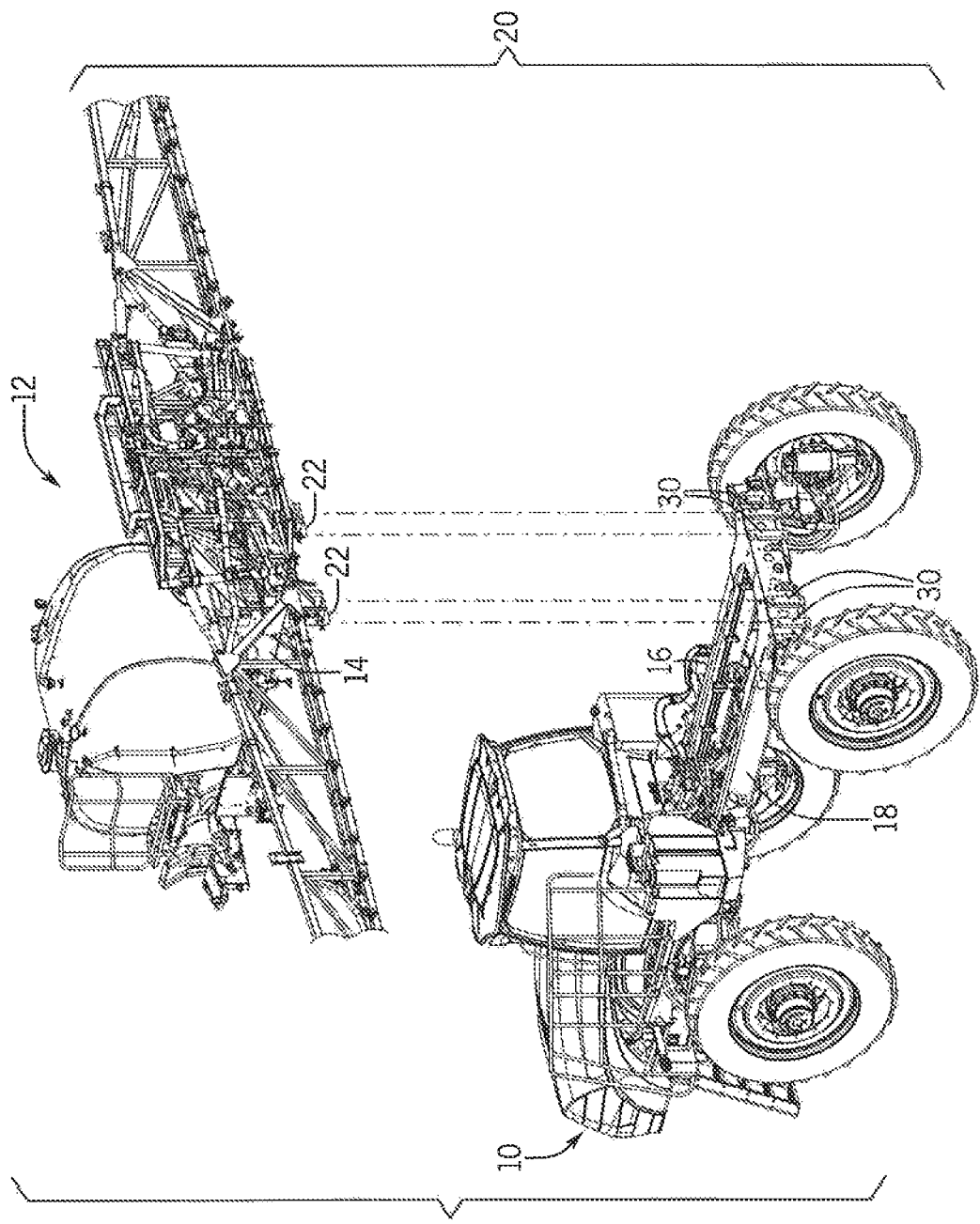
FIG. 1 is an exploded isometric illustration of an agricultural product applicator and a skid-mounted sprayer apparatus, including a captured hardware equipment mounting system according to the invention.

FIG. 1 shows an exemplary embodiment of an agricultural applicator 10 and skid-mounted agricultural product application equipment, in the form of a sprayer apparatus 12 having a skid 14 that is adapted for removable mounting on a bed 16 of a frame 18 of the applicator 10. As described in more detail below, with reference to FIGS. 2 and 3, when the skid 14 of the sprayer apparatus 12 is properly aligned with the frame 18 and resting on the bed 16, the skid is secured to the back end of the frame 18 with a combination captured hardware and shear block equipment mounting system 20, in accordance with the invention. As will be understood from the following description, the captured hardware and shear block aspects of the exemplary embodiment may be used independently of one another in other embodiments of the invention.

Figure 2:
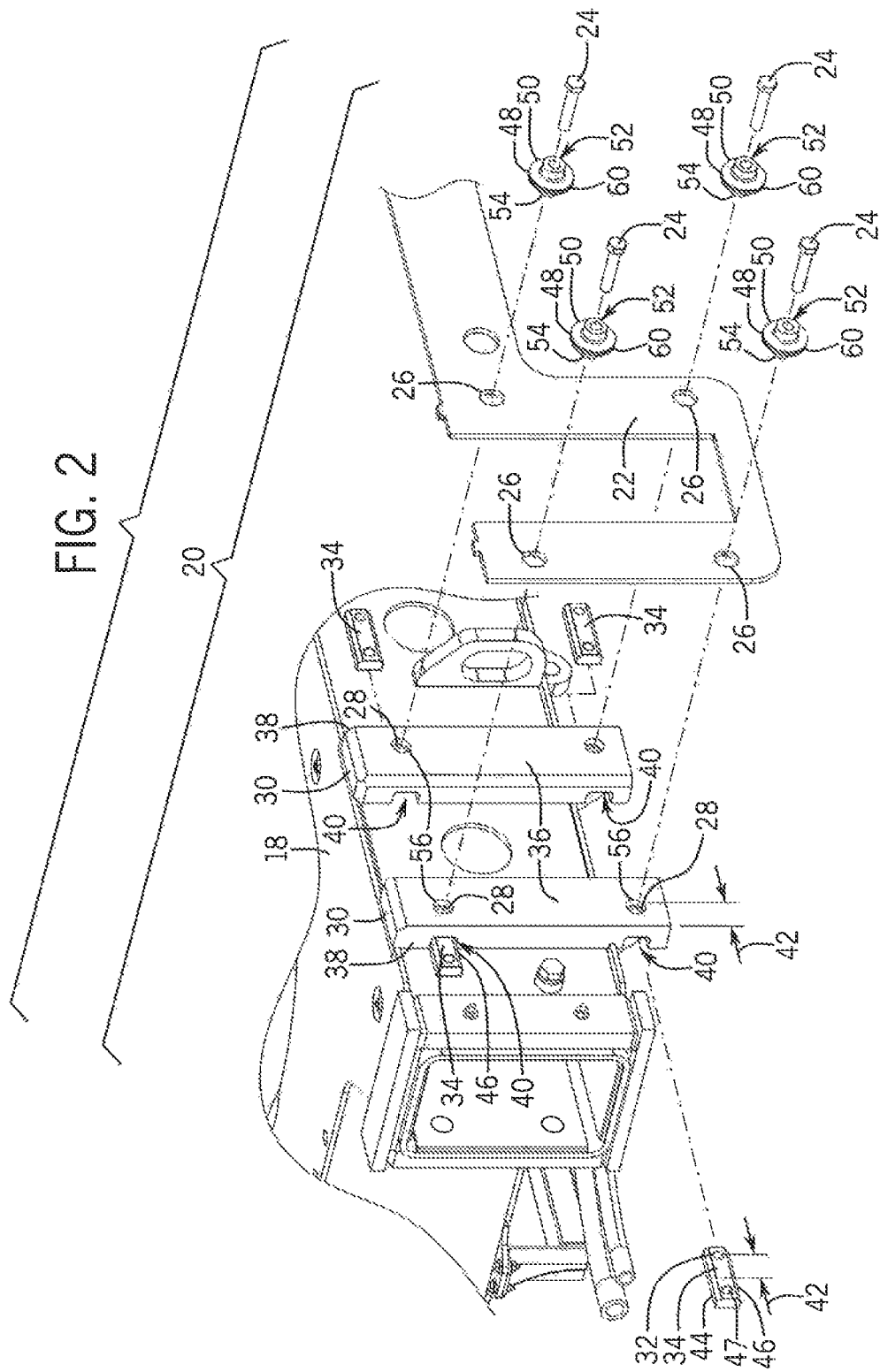
FIG. 2 is an enlarged, exploded, isometric illustration of the captured hardware equipment mounting system of the agricultural product applicator and sprayer apparatus shown in FIG. 1.
Figure 3:
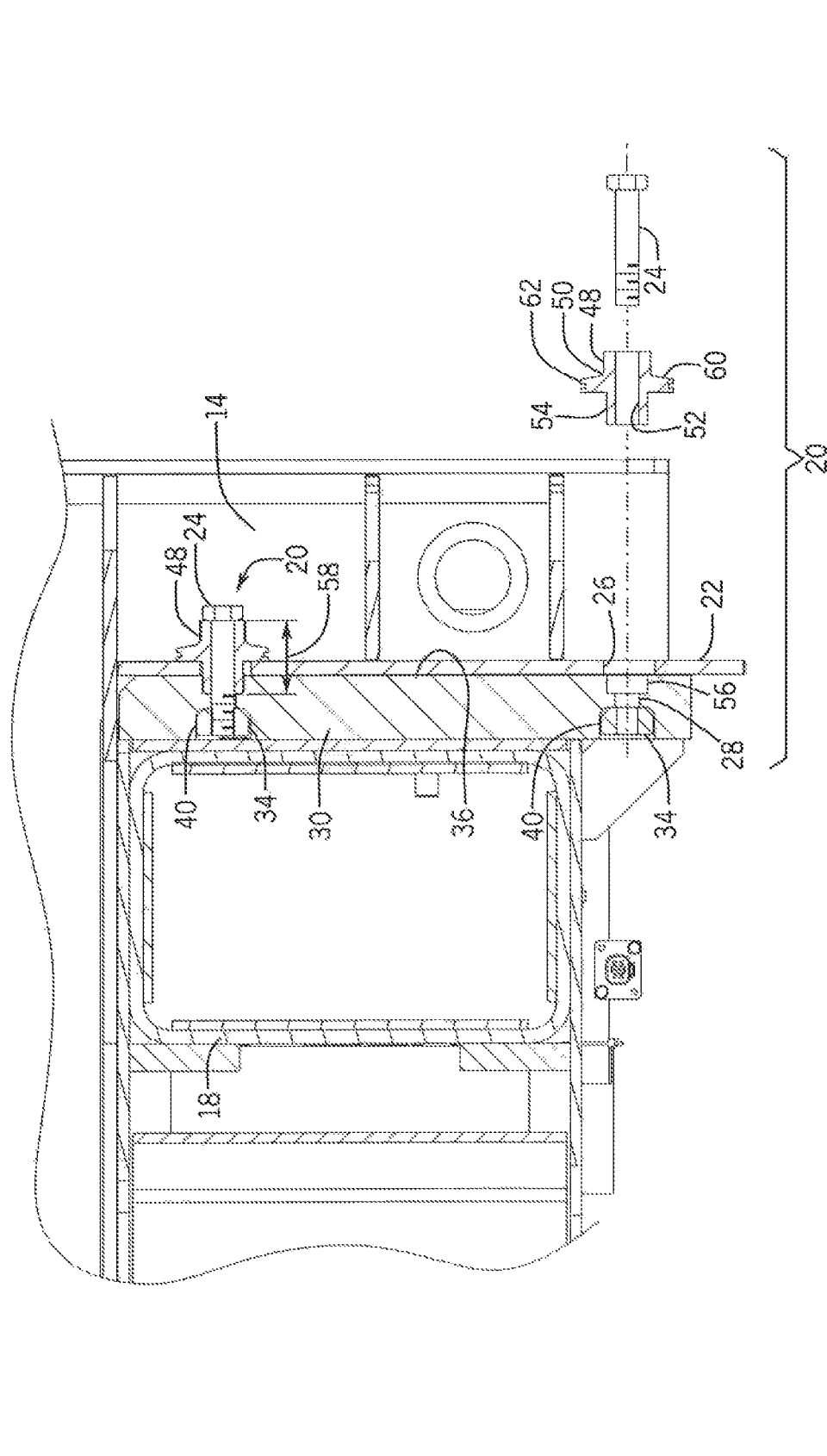
FIG. 3 is cross sectional illustration of the captured hardware system of FIG. 2, showing the components of the captured hardware equipment mounting system in an assembled state, securing the skid-mounted sprayer to the applicator.

As shown in FIGS. 1-3, in the exemplary embodiment, the combination captured hardware and shear block system 20 secures a pair of skid mounting plates 22 of the skid-mounted sprayer 12 to the frame 18 of the applicator 10, using eight mounting bolts 24 passing through holes 26 in the skid mounting plates 22, and holes 28 in a series of four mounting bars 30 extending from the rear of the frame 18, and into operative threaded engagement with threaded holes 32 in eight extended T-nuts 34 inserted into slots 40 in the mounting bars 30.

As best seen in FIGS. 2 and 3, each of the four mounting bars 30 defines a mating surface 36 and an exposed edge 38 of the mounting bar 30. Each of the four mounting bars 30 also defines two slots 40 disposed below and opposite the mating surface 36, and extending transversely from the exposed edge 38 of the mounting bar 30 in a direction generally parallel to the mating surface 36. The bolt holes 28 in the mounting bars 30 are each disposed at a distance 42 from the exposed edge 38 of their respective mounting bar 30, and extend through the mating surface 36 into a respective one of the transverse slots 40.

As best seen in FIG. 2, each of the eight extended T-nuts 34 has a bar-shaped body 44 configured for sliding insertion into the slots 40 in the mounting bar 30. Each of the T-nuts 34 includes a threaded hole 32 that is oriented for alignment with a bolt hole 28 in one of the mounting bars 30, when the extended T-nut 24 is inserted into a slot 40 in the mounting bar 30, for securing the skid 14 to the frame 18 with the mounting bolt 24 passing through the hole 26 in the skid mounting plate 22 and the hole 28 in the mounting bar 30.

The threaded hole 32 in the body of the T-nut 34 is located such that the body 44 of the T-nut 34 has an exposed end 46 that extends farther than the distance 42 from the hole 32, and thus extends beyond the exposed edge 38 of the mounting bar 30 when the threaded hole 32 in the T-nut 34 is aligned with the bolt hole 26 in the mounting bar 30. Having the body 44 of the T-nut 34 extend beyond the mounting bar 30, in this manner, facilitates moving the T-nut 34 within the slot 40 for aligning the threaded hole 32 in the T-nut 34 with the hole 26 in the mounting bar 30. This is particularly advantageous in applications where limited access to the threaded end of the mounting bolt 24 would otherwise make it difficult or impossible to thread a conventional nut onto the bolt threads and hold the conventional nut in place while tightening the mounting bolt 24.

In the exemplary embodiment, the exposed end 46 of each of the T-nuts 34 includes a hole 47, or other positioning feature, to facilitate sliding the T-nut 34 in the slot 40 of the mounting bar 30 for aligning the threaded hole 32 in the T-nut 34 with the hole 28 in the mounting bar 30.

It will be appreciated that, although the mounting bars 30 are integral with the frame 14 in the exemplary embodiment, they may be removably attached to one of the members being secured together in other embodiments of the invention.

As best seen in FIGS. 2 and 3 a transverse slot 40 in the mounting bar 30 may be at least partly closed opposite the mating surface 36, as is the case for the upper slots 40 in the exemplary embodiment, in which the rear of the frame 18 blocks fore-aft access to the threaded end of the upper mounting bolts 28. The sliding T-nuts 34 of the invention thus make installation of the upper mounting bolts 24 considerably easier than would be the case if it were necessary to use conventional nut and bolt arrangements.

As further shown in FIGS. 2 and 3, the lower slots 40 in the mounting bars 30 of the exemplary embodiment are open on their forward-facing ends, because the mounting bars 30 extend below the frame 18. It will be appreciated by those having skill in the art, that even with the lower slots 40 being forwardly-opening, the design of the T-nuts 34 and slots 40 still provides considerable advantage in getting the sprayer 12 secured to the frame 18 of the applicator 10.

As best seen in FIGS. 2 and 3, in the exemplary embodiment of the applicator 10 and sprayer 12, each of the mounting bolts 24 also passes through a shear block 48 inserted into one of the holes 26 in the skid mounting plates 22. The shear block equipment mounting system aspect of the combined mounting system of the exemplary embodiment includes the four mounting bars 30, and eight shear blocks 48 for operatively engaging the mounting bars 30 and the skid mounting plates 22.

The shear blocks 48 are adapted for insertion through one of the skid mounting plates 22 and into engagement with a respective mounting bar 30 for resisting shear forces on the mounting bolts 24 when the mounting bolts 24 are securing the skid 14 to the frame 18. Each of the shear blocks 48 has a body 50 defining a bolt hole 52 therein that is adapted for passage therethrough of a mounting bolt 24. The shear blocks 48 also have a shear block pilot 54 disposed about the bolt hole 52 in the shear block body 50 and configured for engagement with one of the mounting bars 30 and with a respective hole 26 in one of the skid mounting plates 22.

The mating surfaces 36 of the mounting bars 30 also include a recess 56 in the mating surface 36 disposed around each of the bolt holes 28 in the mounting bars 30. These recesses 56 are adapted for receiving and operatively engaging the pilot 54 of the shear block 48, in the manner illustrated in FIG. 3.

The pilot 54 and bolt hole 52 in the shear block 48, the hole 26 through the skid mounting plate 22, and the recess 56 in the mating surface 36 of the mounting bar 30 are cooperatively configured in such a manner that shear forces are transferred, between the skid 14 and frame 18, substantially through the shear block pilot 54. Those having skill in the art will appreciate that, by having the shear forces transferred substantially through the pilot 54 of the shear block 48, rather than through the mounting bolts 24, the mounting bolts can be made substantially smaller in diameter, which significantly facilitates securing the skid 14 to the frame 18, and provides advantages such as reduced size, weight, bolt torque requirements and cost of the mounting system 20.

As shown in FIG. 3, in the shear block equipment mounting system 20 of the exemplary embodiment, the shear blocks 48 also have a longitudinal length 58 configured to provide a desired tensile stress at a predetermined torque on a mounting bolt 24 passing through the shear block 48 and into threaded engagement with the bolt hole 32 in the T-nut 34. The shear blocks 48 further include a flange 60 extending beyond the pilot 54 and adapted for retaining the skid mounting plate 22 longitudinally between the flange 60 of the shear block and the mating surface 36 of the mounting bar 30. The configuration of the shear blocks 48 thus obviates the need for additional mounting hardware, such as spacers and washers that might be necessary in mounting systems using only conventional fastener components.

In the exemplary embodiment, the pilot 54 of each shear block 48 is configured to provide a press fit into the recesses 56 in the mounting bars 30. The shear blocks 48 also include an external groove 62 for engaging a puller or slide-hammer tool for pulling the pilot 54 out of the recess 56, when it is desired to remove the shear block 48.

The pilots 54 in the exemplary embodiment are generally configured to provide a close, sliding fit within the holes 26 through the skid mounting plates 22. The pilots 54 and the holes 26 through the skid mounting plates 22 in the exemplary embodiment are also cooperatively configured, by making the holes 26 slightly elongated vertically, to allow limited motion of the pilot 54 and skid mounting plate 22 with respect to one another in the vertical direction. This arrangement allows a desired, limited amount of vertical movement between the applicator 10 and the sprayer 14, to ensure that the weight of the sprayer 12 and skid 14 rests completely on the bed 16 of the frame 18, and also to accommodate flexing of the structures as the applicator 10 traverses uneven ground.

The pilots 54 of the shear blocks 48 and the recesses 56 are also cooperatively configured to have a longitudinal length and depth respectively, that allows the pilots 54 to "bottom-out" in the recesses 56, as the mounting bolts 24 are tightened, in such a manner that the skid mounting plates 22 are only slidingly clamped in the fore-aft direction, between the flanges 60 of the shear blocks 48 and the mating surfaces 36 of the mounting bars 30. Additional mounting hardware (not shown) is also utilized for securing the skid 14 to the frame 18 in the fore-aft direction. Having the mounting plates 22 only slidingly clamped, as compared to tightly clamped by the flanges 60 of the shear blocks 48, allows the combination captured hardware and shear block equipment mounting systems 20 of the exemplary embodiment to cooperate with one another, and with the additional fore-aft mounting hardware, in securing the skid 14 to the frame 18.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A captured hardware system for securing a skid mounting plate of skid-mounted product application equipment to a frame of an applicator, using a mounting bolt passing through a hole in the skid mounting plate, the captured hardware system including:
    a mounting bar and an extended T-nut:
        the mounting bar defining an inner surface directable towards the frame and extending along a first axis, a mating surface extending along a second axis parallel to the first axis and an exposed edge of the mounting bar perpendicular to and interconnecting the inner surface and the mating surface, the mounting bar also defining a slot extending transversely from the exposed edge of the mounting bar in a direction generally perpendicular to the first and second axes, the mounting bar further defining a bolt hole disposed at a distance from the exposed edge and extending through the mating surface into the slot along a third axis generally parallel to the exposed edge; and
        the extended T-nut having a bar-shaped body configured for sliding insertion into the slot in the mounting bar and a threaded hole for receipt of the mounting bolt oriented for alignment with the bolt hole in the mounting bar when the extended T-nut is inserted into the slot in the mounting bar for securing the skid mounting plate to the frame with the mounting bolt passing through the hole in the skid mounting plate; and
    a shear block adapted for insertion through the skid mounting plate and into press-fit engagement with the mounting bar.

2. The captured hardware system of claim 1, wherein the threaded hole in the body of the T-nut is disposed such that the body of the T-nut includes an exposed end that extends beyond the exposed edge of the mounting bar when the threaded hole in the T-nut is aligned with the bolt hole in the mounting bar, to thereby facilitate moving the T-nut within the slot for aligning the threaded hole in the T-nut with the hole in the mounting bar.

3. The captured hardware system of claim 2, wherein the exposed end of the T-nut includes a positioning feature.

4. The captured hardware system of claim 3, wherein the positioning feature in the exposed end of the T-nut is a hole in the T-nut.

5. The captured hardware system of claim 1, wherein the mounting bar is configured to be integral with the frame.

6. The captured hardware system of claim 1, wherein the slot is at least partly closed opposite the mating surface, impeding access to a distal end of the mounting bolt when the mounting bolt is inserted through the bolt hole in the mounting bar.

7. The captured hardware system of claim 1, wherein the mounting bar includes at least one exposed edge and first and second slots extending substantially parallel to one another, with each of the first and second slots extending transversely from the exposed edge of the mounting bar in a direction generally perpendicular to the first and second axes and parallel to one another, the mounting bar further defining first and second bolt holes disposed at the same distance from the exposed edge, being spaced from each other by a predetermined distance along the second axis, and extending respectively through the mating surface into the first and second slots.

8. The captured hardware system of claim 7, further including a second T-nut for sliding insertion into the second slot.

9. The captured hardware system of claim 1, wherein the shear block resists shear forces on the mounting bolt securing the skid mounting plate to the frame;
    the shear block having a body defining a bolt hole therein for passage therethrough of the mounting bolt and a pilot configured for engagement with the mounting bar and the hole in the skid mounting plate;
    the mounting bar further including a recess therein adapted for receiving the a pilot of the shear block;
    the pilot and bolt hole in the shear block, the hole through the skid mounting plate, and the recess in the mounting bar being cooperatively configured in such a manner that shear forces are transferred between the skid mounting plate and frame substantially through the shear block pilot.

10. The captured hardware system of claim 9, wherein the shear block has a longitudinal length configured to provide a desired tensile stress at a predetermined torque on the mounting bolt passing through the shear block and into threaded engagement with the threaded hole in the T-nut.

\* \* \* \* \*